(No Model.)
S. G. MILLER.
HAY SLING.
No. 386,337. Patented July 17, 1888.
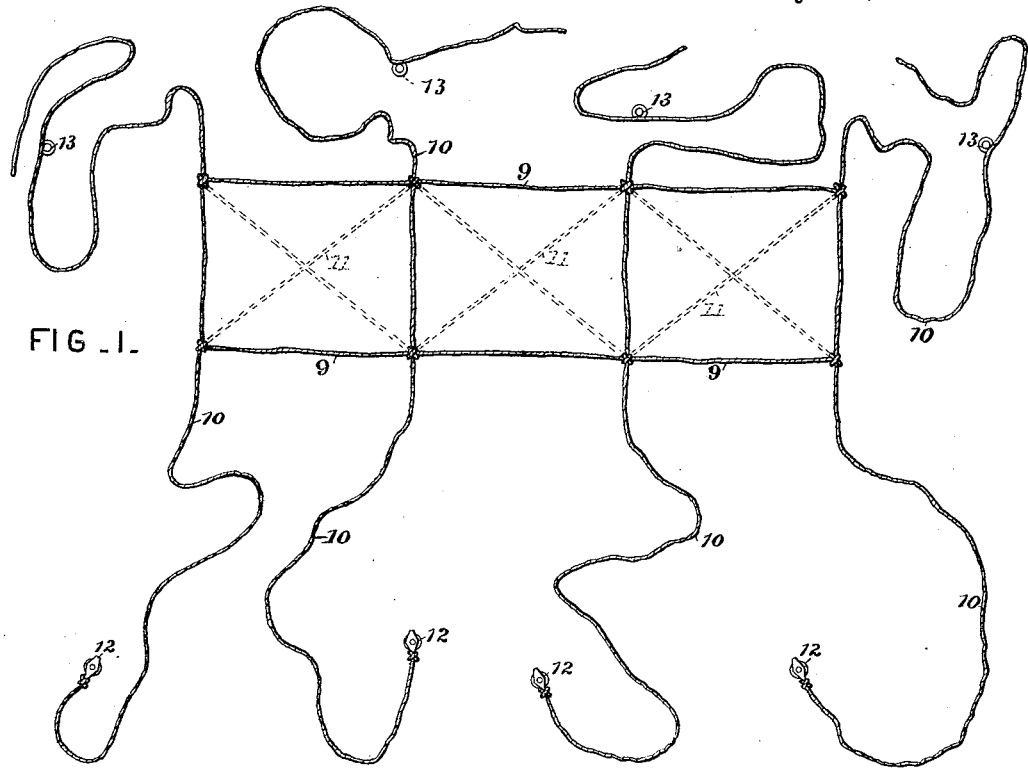
FIG. I.
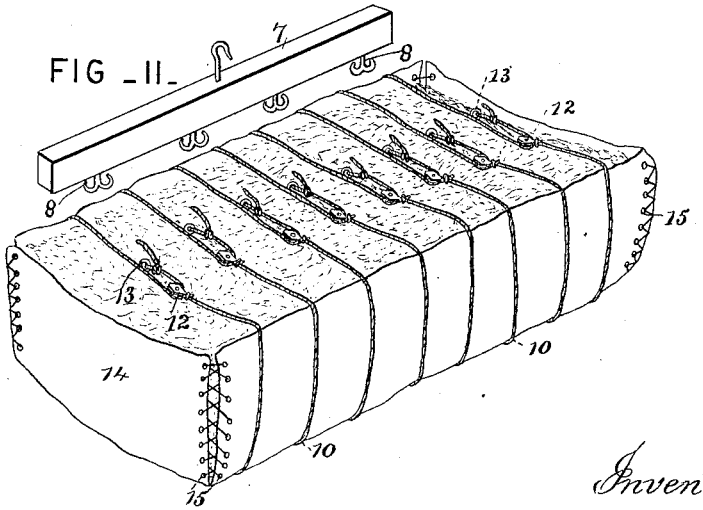
FIG. II.
Attest:
Geo. T. Smallwood.
Jas. K. McCathran.
Inventor
Samuel G. Miller,
By Knight Bros
Attys

UNITED STATES PATENT OFFICE.

SAMUEL G. MILLER, OF ATOKA, TENNESSEE.

HAY-SLING.

SPECIFICATION forming part of Letters Patent No. 386,337, dated July 17, 1888.

Application filed September 1, 1887. Serial No. 248,525. (No model.)

*To all whom it may concern:*

Be it known that I, SAMUEL G. MILLER, a citizen of the United States, residing at Atoka, in the county of Tipton, State of Tennessee, have invented certain new and useful Improvements in Hay-Slings, of which the following is a specification.

My invention relates to slings for hay-elevating devices; and it consists in features of novelty, to be hereinafter described, and then particularly pointed out in the claims.

In order that the invention may be fully understood, reference should be had to the accompanying drawings, in which—

Figure I represents in plan the arrangement of the ropes of the sling. Fig. II is a view in perspective of the canvas employed in connection with the sling when the device is to be used for elevating cotton, together with the beam for elevating the sling.

Before the hay is loaded onto the wagon I place in the latter my improved sling, consisting of the system of ropes shown in Fig. I.

10 represents a number of ropes arranged transversely of the wagon, and 9 represents longitudinal ropes for holding the ropes 10 in proper position. Ropes 9 are preferably at a distance apart equal to the interior width of the wagon-bed, so that the ropes 10 hang out over the frame, and until the wagon is loaded the ends of ropes 10 may be tied under the wagon. Additional stay-ropes, 11, (shown in dotted lines,) may also be provided. At one end the ropes 10 are provided with pulleys 12, and at a suitable distance from the other end are fixed rings 13. When the wagon is loaded, the ends of ropes 10 are passed up over the top of the load, and pulleys 12 receive the opposite ends of the ropes, which are then drawn down and fastened in rings 13. By this means I provide effectually against the sliding of hay from the wagon during transportation. When the wagon-load having the hay thus tied is hauled under the derrick, the hooks 8 of beam 7 are slipped under the double portion of ropes 10 and the load is ready to be raised. It will be readily seen that the power applied to the upper portion of the ropes 10 will lengthen vertically the loops around the hay, compressing the hay laterally and enabling its removal from the wagon bed and frame with little friction.

The invention may be applied to elevating cotton into the gin-house by using the canvas or tarpaulin 14, which may be cut in the form shown in Fig. II, its edges being united by ropes 15 or any other suitable and evident means.

The ropes 9 10 are placed under the canvas in the bed of the wagon before loading, and when the load is made the ends of ropes 10 are brought horizontally over the load and fastened. The act of lifting on the beam draws up the ropes 10, so as to compress the load laterally and free it from the wagon-body.

Having thus described my invention and the manner in which it is used, I desire it to be understood that what I claim as new therein, and desire to secure by Letters Patent, is—

1. The combination of beam 7, having a number of hooks, 8, and the ropes 9 and 10, adapted to be supported by the hooks of said beam, substantially as set forth.

2. The combination of the ropes 9 10, the latter adapted to be arranged longitudinally of the wagon-bed, and the former arranged transversely thereto and projecting beyond the same and carrying on their loose ends pulleys and rings, substantially as and for the purpose set forth.

3. The combination of the beam 7, having hooks, the ropes 9 and 10, arranged crosswise each other, and the canvas supported by said ropes, substantially as set forth.

SAMUEL G. MILLER.

Witnesses:
 OCTAVIUS KNIGHT,
 H. S. KNIGHT.